(12) United States Patent
Horley et al.

(10) Patent No.: US 8,601,324 B2
(45) Date of Patent: Dec. 3, 2013

(54) STORAGE AND OUTPUT OF TRACE DATA

(75) Inventors: John Michael Horley, Hauxton (GB); Christopher Neal Hinds, Austin, TX (US)

(73) Assignee: ARM Limited, Cambridge (GB)

( * ) Notice: Subject to any disclaimer, the term of this patent is extended or adjusted under 35 U.S.C. 154(b) by 555 days.

(21) Appl. No.: 12/805,481

(22) Filed: Aug. 2, 2010

(65) Prior Publication Data
US 2012/0030520 A1    Feb. 2, 2012

(51) Int. Cl.
*G06F 11/00* (2006.01)

(52) U.S. Cl.
USPC ............................. 714/45; 712/227; 717/128

(58) Field of Classification Search
USPC ............................. 714/45; 712/227; 717/128
See application file for complete search history.

(56) References Cited

U.S. PATENT DOCUMENTS

| | | | |
|---|---|---|---|
| 7,069,176 B2 * | 6/2006 | Swaine et al. | 702/176 |
| 7,219,333 B2 * | 5/2007 | Agarwala et al. | 717/128 |
| 7,380,239 B1 * | 5/2008 | Srivastava et al. | 717/128 |
| 7,424,646 B2 * | 9/2008 | Smith | 714/45 |
| 7,437,619 B2 * | 10/2008 | McCullough et al. | 714/45 |
| 7,496,902 B2 * | 2/2009 | Levine et al. | 717/128 |
| 7,934,202 B2 * | 4/2011 | Messmer et al. | 717/131 |
| 8,001,428 B2 * | 8/2011 | Ashfield et al. | 714/45 |
| 8,042,007 B1 * | 10/2011 | Chan et al. | 714/45 |
| 8,055,950 B2 * | 11/2011 | Houlihane et al. | 714/45 |
| 8,176,366 B2 * | 5/2012 | Horley et al. | 714/45 |
| 8,381,041 B2 * | 2/2013 | Walker et al. | 714/45 |
| 2004/0103397 A1 * | 5/2004 | Agarwala et al. | 717/128 |
| 2006/0212761 A1 * | 9/2006 | Levine et al. | 714/45 |
| 2008/0313504 A1 * | 12/2008 | Wedel et al. | 714/45 |
| 2009/0183034 A1 * | 7/2009 | Houlihane et al. | 714/45 |
| 2010/0257510 A1 * | 10/2010 | Horley et al. | 717/128 |
| 2011/0138231 A1 * | 6/2011 | Mayer | 714/45 |
| 2011/0246836 A1 * | 10/2011 | Walker et al. | 714/45 |
| 2012/0216080 A1 * | 8/2012 | Bansal et al. | 714/45 |

* cited by examiner

*Primary Examiner* — Joshua P Lottich
(74) *Attorney, Agent, or Firm* — Nixon & Vanderhye P.C.

(57) ABSTRACT

A trace output unit for collecting, buffering and outputting trace data generated by trace circuitry monitoring processing activities of a data processing apparatus is described. The trace output unit comprises an input for receiving a stream of trace data; a plurality of data stores arranged in parallel with each other for storing the trace data; and storage control circuitry for controlling storage of items of the trace data in the data stores. The control circuitry is configured to route the trace items to selected ones of the data stores and to store control data identifying related trace items stored in different data stores. The trace output unit further comprises output control circuitry configured to identify related trace items stored in different data stores from the stored control data and to recombine the related trace items from different data stores to form an output trace data stream.

26 Claims, 7 Drawing Sheets

STORAGE AND OUTPUT OF TRACE DATA

BACKGROUND OF THE INVENTION

1. Field of the Invention

The field of the invention relates to data processing and in particular to diagnostic mechanisms for monitoring data processing operations.

2. Description of the Prior Art

There are a number of situations where it is desirable to keep track of the processing being performed by a processing circuit. For example, such information is useful during the development of data processing systems. An example of a tool that may be used to assist in such a process is a tracing tool.

Tracing the activity of a data processing system whereby a trace stream is generated that includes data representing the step-by-step activity within the system is a highly useful tool in system development. Such tracing tools use a variety of means for tracing the program flow including embedded trace macrocells (ETM, a trademark of ARM Limited, Cambridge) which are present on the chip whose processing is being monitored.

One problem associated with tracing the activity of a processing system is the amount of data that is generated and needs to be collected and also the fact that this data is not generated uniformly, such that during some clock cycles more trace data is generated than during others. To address this problem and ensure that the trace data can be consistently captured and output the trace data is buffered after capture and before output. In order to ensure that no data is lost by buffer overflow the buffer must be capable of receiving the largest amounts of trace data that may be generated. This is expensive in hardware.

Furthermore, the trace data is often generated in a sparse fashion, so that certain channels generate no trace data during several cycles. A data store with a data width sufficient to store the largest amount of data that can be generated in a single cycle is generally used. When less data is generated in order to efficiently store this data, the data must be packed together and rotated prior to storage in this wide data store. This is not only very expensive in pack and rotate functions, but also the routing requirements for the data items is considerable. With decreasing geometries this routing becomes even more problematic.

It would be desirable to be able to buffer the trace data prior to output without the need for large data stores and expensive routing, pack and rotate functions.

SUMMARY OF THE INVENTION

A first aspect of the present invention provides a trace output unit for collecting, buffering and outputting trace data generated by trace circuitry monitoring processing activities of a data processing apparatus, said trace output unit comprising: an input for receiving a stream of trace data; a plurality of data stores for storing said trace data arranged in parallel with each other; storage control circuitry for controlling storage of items of said trace data in said data stores, said control circuitry being configured to route said trace items to selected ones of said data stores and to store control data identifying related trace items stored in different ones of said plurality of data stores; output control circuitry configured to identify related trace items stored in said different ones of said plurality of data stores from said stored control data and to recombine said related trace items from different data stores to form an output trace data stream.

The present invention recognises that a trace data stream is not formed of random information but is made up of discrete trace items. It realises that such items can be efficiently stored in multiple parallel data stores and that by replacing a single data store with multiple parallel data stores, the circuitry required for routing and packing the data can be simpler and these tasks can be managed more easily. Thus, multiple parallel stores are provided and routing circuitry routes received, trace items to the relevant store and stores control data identifying related items stored in different stores. In order to be able to regenerate the trace stream from the items stored in different data stores the control data is used to recombine the related items to form an output trace data stream.

In some embodiments at least some of said data stores are of different data widths and depths, and said received stream of trace data comprises a plurality of different types of trace items, said storage control circuitry being configured to route a trace item of a same type to a same at least one data store.

In many trace situations the amount of trace data that is output in a single cycle can vary considerably up to a maximum value. Embodiments of the present invention recognise that there are several different items of trace information that can be output in each clock cycle and that some may be output on nearly every cycle, while others are output rarely. Furthermore, it recognises that these different items may generally have different sizes. Having recognised this, embodiments of the present invention makes use of this feature by providing data stores of different sizes, the widths of the stores being suitable for storing particular items and the lengths being related to the frequency of occurrence of the item(s) or part of an item that is stored. In this way the overall storage capacity required by the trace data buffer can be reduced without the store overflowing. It should be noted that some items have a size that varies. They may be stored in a data store configured to store the largest possible size they can have or they may be stored in more than one data store. The latter is particularly useful if the different sized items are generated with a different frequency. In this case data stores of different sizes can be used. Thus, a data store with many entries can be used to store the smaller sized items and a portion of the larger sized items, while the additional bits of the larger sized items can be stored in a data store with a larger width but fewer entries.

In some embodiments said control circuitry is configured to store said control data identifying related trace items in one of said data stores in association with at least one of said related trace items.

The control data identifying related trace items is required in order for the output control circuitry to be able to output a correct trace data stream. This control information can be stored in a variety of places, however one convenient place to store it is within the data store itself in association with at least one of the related trace items. Thus, it may be stored in a first one of the data stores and it may indicate that the second data store has a related item stored in it or not and the data stored in the second data store may have information indicating whether or not a related data item is stored in the third data store and so on. Arranging storage of the control data in this way is particularly convenient where there is always data output to the first data store and the other data stores sometimes receive data.

In alternative embodiments, said plurality of data stores comprises a plurality of trace data stores for storing said trace items and a control data store for storing said control data.

It may also be convenient to have a control data store for storing this control data. Control data related to particular items will be stored at the same time as those items and thus, can be related back to them. In this way, the trace data stores themselves are configured to store the maximum amount of trace data and the additional control data is stored in the control data store.

In some embodiments, said control data store is further configured to store a synchronisation indicator said output control circuitry being responsive to detection of said synchronisation indicator in said control data store to generate a synchronisation packet and to output said synchronisation packet in said output trace data stream.

During the output of trace data, synchronisation packets are output from time to time in order for the diagnostic apparatus to be able to detect a suitable point in the trace stream to start analysis, which is particularly important when trace is store in a circular buffer and compression techniques are used to reduce the quantity of trace data. The trace output unit can efficiently output this data by storing a synchronisation indicator in the control data store. As the synchronisation packet typically has a standard form, the actual packet itself does not need to be stored, just an indicator that this packet should be output. The output control circuitry can then respond to receipt of the synchronisation indicator to output the required packet. As the control data store is configured to store control data generally relating to the trace data stored in the trace stores, providing it with this additional function is an efficient way of allowing synchronisation data to be output.

In some embodiments said storage control circuitry is configured to suppress storage of said trace data for a clock cycle in which said synchronisation indicator is stored in said control data store.

Although, the synchronisation indicator can be stored in the control data store along with trace data being stored in the corresponding data stores and any control data relating to them, it may be that the control data store is only configured to store a certain amount of data and cannot store the synchronisation indicator alongside normal control data. If this is the case, the storage control circuitry is configured to suppress storage of the trace data for the clock cycle in which the synchronisation indicator is stored in the control data store. Thus, at the output circuitry during this particular clock cycle the synchronisation indicator is received and no trace data.

In some embodiments said storage control circuitry is responsive to receipt of a synchronisation indicator to store control data indicative of said synchronisation indicator in one of said plurality of data stores, said output control circuitry being responsive to detection of said synchronisation indicator in said one of said plurality of data stores, to generate a synchronisation packet and to output said synchronisation packet in said output trace data stream.

In some trace output units, the synchronisation indicator is stored in one of the plurality of data stores not necessarily in the control data store. It may be stored alongside the trace data, or it may be that data stored in the data store is suppressed for that clock cycle and it is just the synchronisation indicator which travels through the data store at this point.

In some embodiments, said trace items comprise items of trace data indicative of said monitored processing activity, items indicating a source of said trace data and items providing timestamp information, said control data identifying related items.

The trace items that are received in the trace stream can be a number of things, including trace data which is indicative of the processing activity that is being monitored, items that indicate the source of this trace data, this may be applicable where there are multiple sources of trace data in the processor that are all being monitored and items providing timestamp information. The trace data is output more often than the other information and therefore the data store for storing this data is generally deeper than that for storing the other information. Timestamp information is generally only output occasionally and source information only when the source of the received trace data changes. When this additional information is output then control data is generated that identifies these related items thereby allowing the output circuitry to output them together.

In some embodiments, said input comprises a plurality of parallel data paths at least some of said data paths transmitting trace data more frequently than other of said data paths, said storage control circuitry being configured to route data to one of said plurality of data stores in dependence upon a data path said data is received on.

Although, the control circuitry can route the data in a number of ways, in some embodiments it routes data to the data store in dependence upon the data path it is received upon. The data path the data is received upon is an indication of the type of item that it is. Where the data is sparsely generated, and the characteristics of the trace stream are known, one can determine which items are likely to be generated more often and which size they are and thus, one can predict the amount of data to come down each data path and can provide suitably sized data stores to store it in.

In some embodiments, said input comprises a plurality of parallel data paths at least some of said data paths transmitting trace data more frequently than other of said data paths, said trace output unit further comprising packing circuitry configured to pack said received trace data such that said received data is arranged in adjacent locations prior to said trace data being routed to at least one of said plurality of parallel data stores.

In an alternative embodiment, rather than simply routing data paths to particular data stores, packing circuitry is used to pack the received data and then, route the packed data to a particular data store. This has a disadvantage of requiring additional packing circuitry but the advantage that data is always arranged in a certain way, such that the frequency of occurrence of the bits will vary across the data paths from a high frequency to a low frequency. Thus, a long buffer can be used to store the bits where the frequency is highest with smaller buffers being used to store the less frequently generated bits.

In some embodiments, said plurality of parallel data stores are formed of a plurality of buffers connected together via routing circuitry, said routing circuitry being controllable to connect at least some of said buffers in series with each other to form one of said data stores with a data depth equal to a sum of a data depth of said buffers connected in series, and to connect at least some of said buffers in parallel.

When configuring a system the size of the data stores can be chosen based on a general idea of the characteristics of the trace data stream that is expected. In some embodiments this is done by forming the data stores from buffers connected together via routing circuitry. The routing circuitry can be controlled to connect the buffers in series with each other to form one data store with a depth equal to a sum of the data depths of the buffers connected in series and/or to connect them in parallel. In this way, the routing circuitry can be used to provide the size of the data stores required depending on what trace items are expected in the trace data stream.

In some embodiments, said storage control circuitry is configured to control said routing circuitry to connect different ones of said at least some buffers in series with each other to increase or decrease a data depth of one of said data stores in dependence upon a configuration of said input trace stream.

Sometimes the characteristics of the trace data stream may change for a particular reason. It may therefore be advantageous to be able to change the size of the data stores to mirror such changes in the characteristics of the trace data stream. This is done in embodiments of the invention by controlling the routing circuitry to connect different ones of the buffers forming the data stores in series, thereby increasing or decreasing the depth of a data store as required.

In some embodiments the trace output unit further comprises a programmable configuration register for storing configuration data, said storage control circuitry being configured to control said routing circuitry in dependence upon said stored configuration data.

One way of controlling the size of the data stores is to use a programmable configuration register which stores configuration data that can be changed by a programmer. The storage control circuitry configures the routing circuitry in dependence upon the stored configuration data. Thus, if the nature of the trace data stream is to change for some reason, the programmer can change the information stored in the configuration register and the capacity of the different data stores can be changed by the routing circuitry to fit the new situation.

In some embodiments, said storage control circuitry is configured to determine current storage requirements of said plurality of parallel data stores in dependence upon said received trace data stream and to control said routing circuitry to connect said buffers to form said parallel data stores with said required storage capacity.

One way of dynamically changing the storage capacity of the data stores to reflect the current operating conditions is to configure the storage control circuitry to monitor the received trace data stream and to determine the current storage requirements from this. The routing circuitry can then be controlled to connect the buffers to form the parallel data stores with the determined storage capacity.

Alternatively, said storage control circuitry comprises monitoring circuitry for monitoring occupancy of said plurality of data stores, said storage control circuitry determining said current storage requirements from said monitored occupancy.

An alternative way of controlling the storage capacity to reflect current conditions is for the storage control circuitry to monitor the occupancy of the plurality of data stores and to determine the current storage requirement from this monitored occupancy.

In other embodiments, said storage control circuitry is configured to monitor said input trace stream and to determine said storage capacity requirements from a configuration of said input trace stream.

The storage control circuitry can look at the configuration of the input trace stream and determine when this configuration changes and it can change the storage capacity requirements in response to this.

In some embodiments, said trace output unit further comprises power management circuitry for controlling clocking of said buffers, said storage control circuitry being configured to determine current storage requirements of said plurality of parallel data stores and to control said routing circuitry to connect said buffers to form said parallel data stores with said required storage capacity and to disconnect any buffers not required from said data stores and to not clock said disconnected buffers.

Where the data stores are configurable and their sizes can be changed, it may be that some of the buffers that form these data stores are not required during certain times. It is advantageous if this is the case for power management circuitry to inhibit the clocking of these data stores and thereby reduce the power consumption of the device.

In some embodiments, said storage control circuitry is configured to determine said current storage requirements periodically during said tracing of said processing apparatus.

The current storage requirements of the data stores can be determined prior to tracing in dependence upon a known tracing process which is about to occur. Alternatively, it can be determined periodically during trace in response to monitoring the trace input stream or the occupancy of the buffers.

A second aspect of the present invention provides a trace output unit for collecting, buffering and outputting trace data generated by trace circuitry monitoring processing activities of a data processing apparatus, said trace output unit comprising: an input for receiving a stream of trace data; a plurality of data stores for storing said trace data, said plurality of data stores being formed of a plurality of buffers connected together via routing circuitry, said routing circuitry being controllable to connect at least some of said buffers in series with each other to form one of said data stores with a data depth equal to a sum of a data depth of said buffers connected in series, and being controllable to connect at least some of said buffers in parallel with each other; storage control circuitry for controlling storage of items of said trace data in said data stores, said control circuitry being configured to route said trace items to selected ones of said data stores and to store control data identifying related trace items stored in different ones of said plurality of data stores; output control circuitry configured to identify related trace items stored in said different ones of said plurality of data stores from said stored control data and to recombine said related trace items from different data stores to form an output trace data stream.

A trace output unit that stores the trace data in a plurality of data stores has advantages as described earlier. There are further advantages if the plurality of data stores are formed from buffers that can be connected together via routing circuitry where the routing circuitry is controllable so that the size of the data stores can be varied in dependence on the storage requirements. It is particularly advantageous, if in some circumstances all of the buffers can be connected in series for a certain period where it is known that a trace item of a particular size will be output with no related items for this period. When it is determined when the output is to change and further items are to be output, the routing circuitry can amend the arrangement of the buffers and provide some data stores in parallel with each other.

A third aspect of the present invention provides a trace unit comprising trace circuitry for monitoring at least one processor and for generating trace data indicative of a behaviour of at least said one processor and a trace output unit according to a first aspect of the present invention for receiving said trace data generated by said trace circuitry and for outputting said stream of output trace data.

A fourth aspect of the present invention provides a data processing apparatus comprising at least one processor for processing data; and a trace unit according to a third aspect of the present invention, for monitoring said at least one processor and for generating trace data indicative of a behaviour of said at least one processor.

A fifth aspect of the present invention provides a method of collecting, buffering and outputting trace data generated by trace circuitry monitoring processing activities of a data processing apparatus, comprising the steps of: receiving a stream of trace data comprising a plurality of trace items at a trace data input; routing said plurality of trace items to selected ones of a plurality of data stores arranged in parallel with each other; and storing said plurality of trace items in said selected data stores; storing control data identifying related trace items stored in different ones of said plurality of data stores; identifying related trace items stored in said different ones of said plurality of data stores from said stored control data; recombining said related trace items to form an output trace data stream; and outputting said trace data stream.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
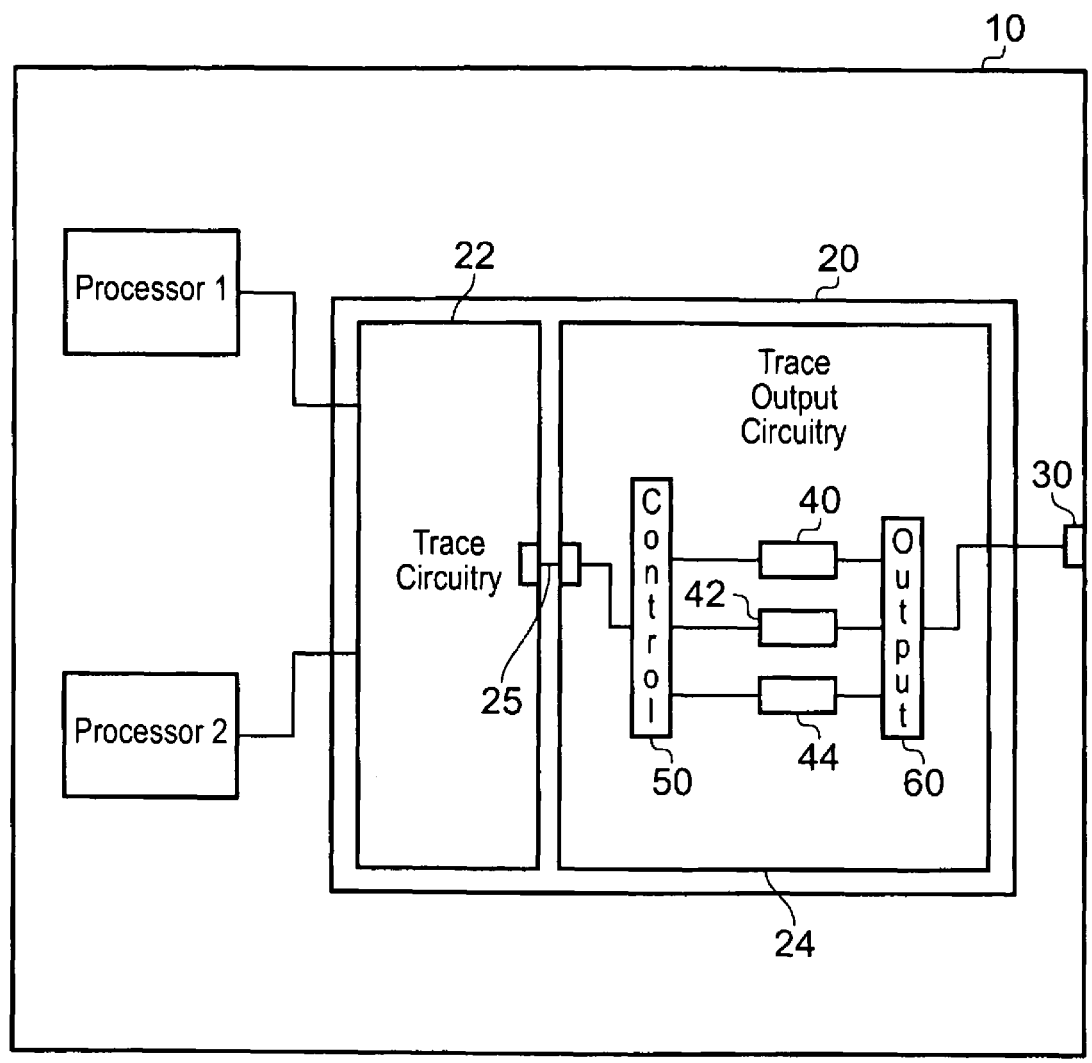
FIG. 1 shows a data processing apparatus according to an embodiment of the present invention.

FIG. 1 shows a data processing apparatus 10 according to an embodiment of the present invention. Data processing apparatus 10 is a multiprocessor apparatus with a processor 1 and processor 2 processing data. There is a trace unit 20 for monitoring the processing activities of both processor 1 and processor 2 and for generating trace data that is output at output port 30. This trace data is forwarded to a diagnostic apparatus that analyses the trace data to determine the step by step data processing operations of the processors.

Trace unit 20 comprises trace circuitry 22 which monitors the activities of the processors and generates trace data and trace output circuitry 24 that controls the output of this data. The trace data generated depends on the trace function performed by the trace circuitry however, it is generally generated in a sparse fashion with different sizes and types of trace items being generated at different times. Thus, in a single cycle perhaps 17 bytes of trace will be generated, while in another cycle there may be only 5 bytes. Thus, the width of the bus 25 transmitting trace data from trace circuitry 22 to trace output circuitry 24 must be sufficiently wide to carry the maximum amount of data that can be generated in a cycle, in this example 17 bytes. However, during many cycles far less data will be transmitted.

The trace output circuitry needs to buffer this trace data prior to outputting it. The data stores used to buffer the trace data should be able to accommodate the maximum amount of data that may be received during a single cycle. In this embodiment the data is stored prior to output in at least one of data stores 40, 42 and 44 that are arranged in parallel with each other within trace output circuitry 24. Storage control circuitry 50 controls the routing of the received trace data to these data stores and also generates control data identifying related trace items stored in different data stores. In this embodiment the control data is stored alongside the trace item it is identifying as having a related item. Output circuitry 60 then outputs the buffered data as a trace output stream with the control data determining the order that it is output in.

Although, the data stores may have a number of forms, in some embodiments they are shift-register buffers such that during each cycle a row of each of the buffers is available for storing data and during the next cycle the next row of the buffer is used. Thus, related data is stored in a same row in different buffers.

It should be noted that as the amount of trace data received in a single cycle varies and as certain items of trace data are received more often than other items, the data stores can be configured to have different sizes and different widths to accommodate the expected trace data. Thus, in one example there may be 17 bytes of trace data as a maximum that can be output in a single cycle, 3 bytes of which will be to indicate the channel or process being traced, 5 bytes will be for accommodating the actual trace data and 9 bytes the timestamp. Now the trace data is output regularly, while the channel data only needs to be output when the source of the trace data changes and timestamp information only needs to be output occasionally. Thus, if we know that generally trace data of this form has 20% of the data packets generated with a timestamp and that the source changes rarely. A first data store for the data with a width of 5 bytes, this being the maximum width that the data will have and a substantial depth can be provided. A second data store for the timestamp which is 9 bytes wide but is 20% of the depth of the data store can be provided along with a channel data store which is 3 bytes wide and is say also 20% of the depth of the data data store. In this way, the data stores are configured to accommodate the expected trace data stream generated and the storage space is used efficiently.

Furthermore, by dividing the data stores in this way, the routing of the different trace items to their respective data stores can be done efficiently. In this regard, there are a number of different possible ways that the routing can occur which will be described with respect to the following embodiments.

Figure 2:
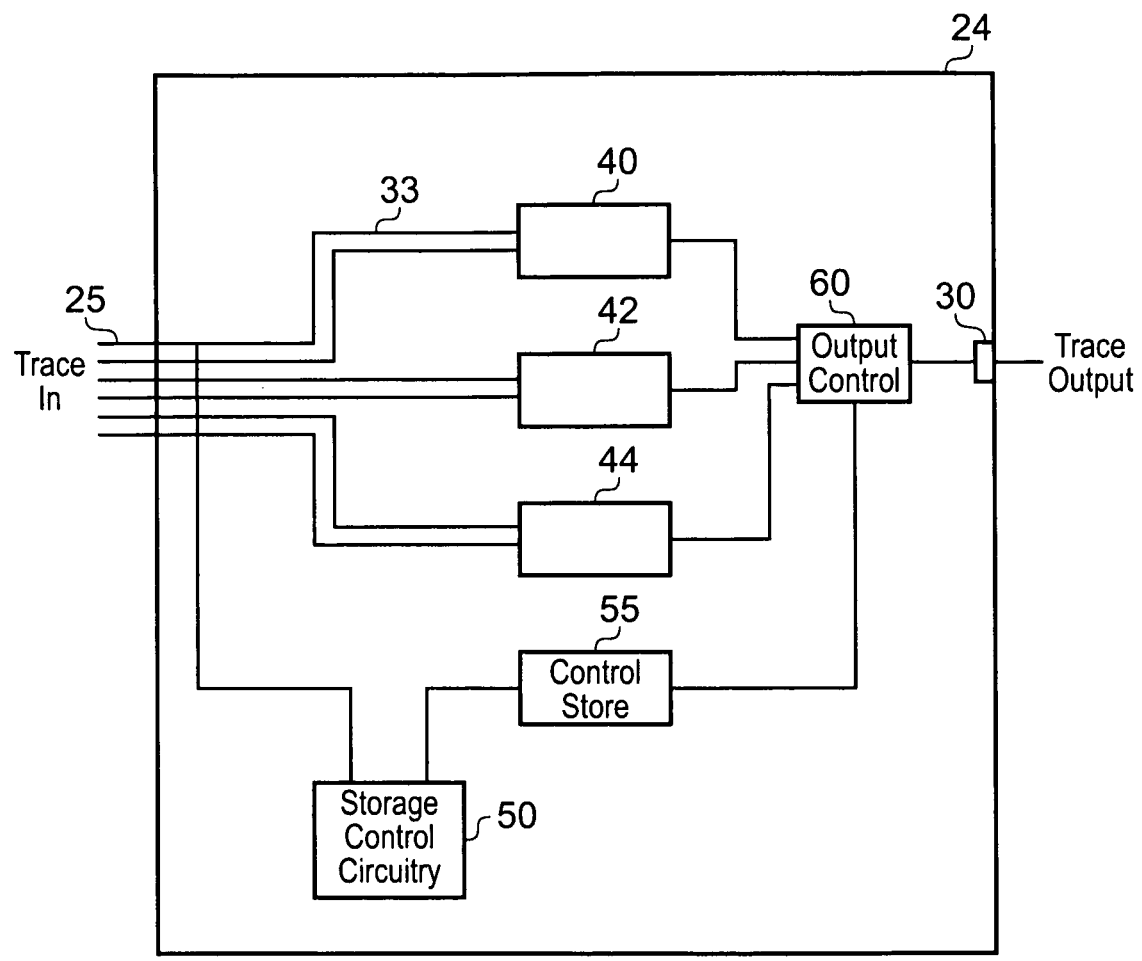
FIG. 2 shows a trace output unit with a control buffer according to an embodiment of the present invention.

Although in the above example different data stores are used to store different trace items, a trace item may in some embodiments be stored in more than one data store. Thus, data store 44 may be configured to store a particular size of trace data that is usually output but that is sometimes although rarely exceeded. The data paths routing the upper bits of the trace data that rarely carry any information are routed to a different data store, data store 40 for example. When there is information on these data paths, then control data will be stored to indicate this. In the embodiment of FIG. 2, this control data will be stored alongside the data in data store 44.

In other embodiments some trace items may usually have a certain size but will occasionally have a larger size. This may be the case with timestamps for example, where perhaps an increment in time is generally output with a small data value but occasionally a larger data value indicating the complete timestamp value is output. In such a case it is efficient to output the lower bits of the timestamp data that are often received to a narrow but deep data store, while the additional bits that occur occasionally are output to a wide but shorter data store. Control data is stored to indicate where there is the additional data stored in the wider data store.

FIG. 2 shows the trace output circuitry 24 according to an embodiment of the present invention. In this embodiment, the input trace stream 25 is transmitted to the output circuitry via a bus having a number of data paths or bus channels, each of which are dedicated to transmitting particular portions of the trace items. Thus, some of the paths carry timestamps, some carry the trace data and some carry the source information identifying the channel that generated the trace data. In this embodiment, routing circuitry 33 routes the received trace data in dependence upon the data path it was received on to one of the three trace data stores 40, 42, 44. Storage control circuitry 50 monitors the input trace data stream and generates control data indicating which items stored in the different data stores are related to each other. This control data is stored in entries corresponding to the data store entries storing the related items in control data store 55. It should be noted that in the previous embodiment, the control data was stored in the trace data stores alongside the trace items that it related to. However, in this embodiment there is a separate control data store for storing this information. Output control circuitry 60 receives the information from the control data store and in response to this controls the data output by the trace data stores 40, 42, 44 to generate an output trace stream that is then output via output port 30.

In addition to the control data identifying related trace items, control data store 55 can also store synchronisation control information indicating that a synchronisation packet should be output. When tracing data, synchronisation packets are output periodically to synchronise the traced data with the processing activities that they are monitoring. In response to a synchronisation indicator stored in the control data store, output control circuitry 60 generates a synchronisation packet which is output via trace output 30. Thus, an indicator that this packet should be output is stored rather than the synchronisation packet itself. It should be noted that the synchronisation indicator can be stored in the control data store alongside any control data during a cycle that trace data is also stored. Alternatively, trace data can be inhibited from being stored during the cycle that the synchronisation indicator is stored in the control buffer such that during that particular cycle it is the only information that the output circuitry receives.

Although, in this embodiment, the synchronisation data is stored in the control data store 55, in other embodiments it may be stored in the trace data stores either alongside the trace data or during a cycle in which storage of trace data is inhibited such that the only information stored in the trace data stores in that cycle is the synchronisation indicator.

Figure 3:
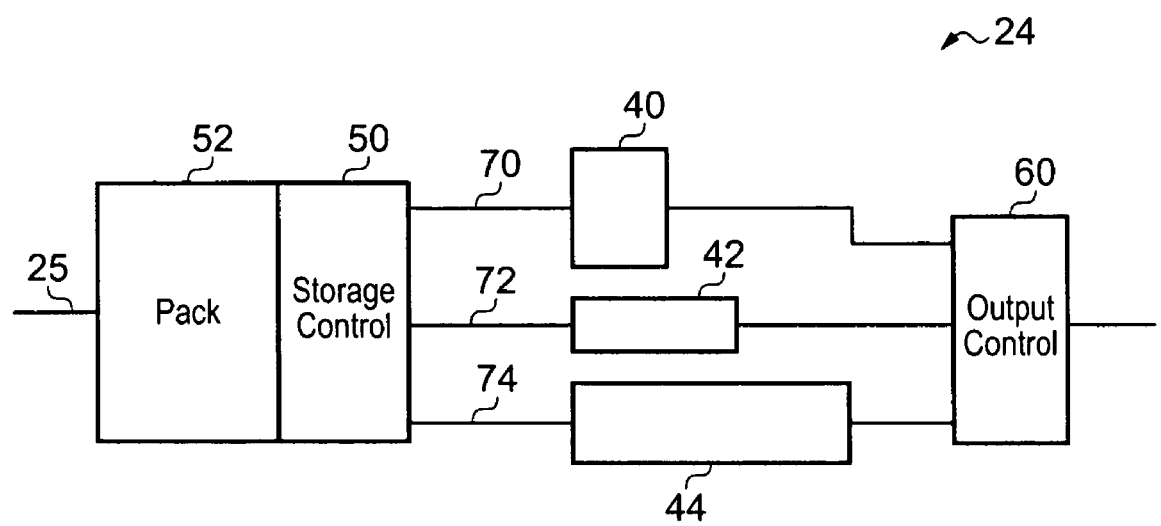
FIG. 3 shows a trace output buffer with pack function according to an embodiment of the present invention.

In the embodiment shown in FIG. 2 the routing circuitry 33 routes the various data paths to the respective trace data stores. FIG. 3 shows an alternative embodiment of output trace circuitry 24 where rather than routing each data path to a particular trace data store, the trace data is received from the trace input stream 25 and is packed by packing circuitry 52 prior to being stored. Packing circuitry 52 packs the data received in adjacent locations such that any empty data path is in effect removed and thus, if there are two trace items one of 3 bytes and one of 5 bytes that are received, these are packed adjacent to each other in the lowest 8 bytes. Storage control 50 then controls the output of this packed data to the different data stores 40, 42, 44. As the data is packed, the required data store sizes are easier to predict in that the data is packed so that data is always output on the first output path 74 to trace data store 44 first. Thus, trace data store 44 has the greatest depth. The width of this data store can be chosen to accommodate the most common width of data present on the trace input stream 25. Any additional data that is too wide to be output on path 74 is output on path 72 to data store 42 and if there is still more data it is output on path 70 to data store 40. Thus, data store 40 has the smallest depth. Storage control 50 also generates control data that is stored alongside any data item to indicate whether or not there is another data item related to that data item stored in one of the other corresponding data stores. Output control circuitry then outputs the data stored in the data store using the control data to generate an appropriate output trace stream.

It should be noted, that although arranging the storage data stores to have different widths and lengths depending on the expected characteristics of the trace data stream may provide an efficient storage regime, if the nature of the trace stream changes or if the trace stream happens to be different to the one expected, the system may no longer be efficient. Thus, in certain embodiments the system is configurable so that the data stores can be changed to accommodate changes in the characteristics of the trace data stream.

Figure 4:
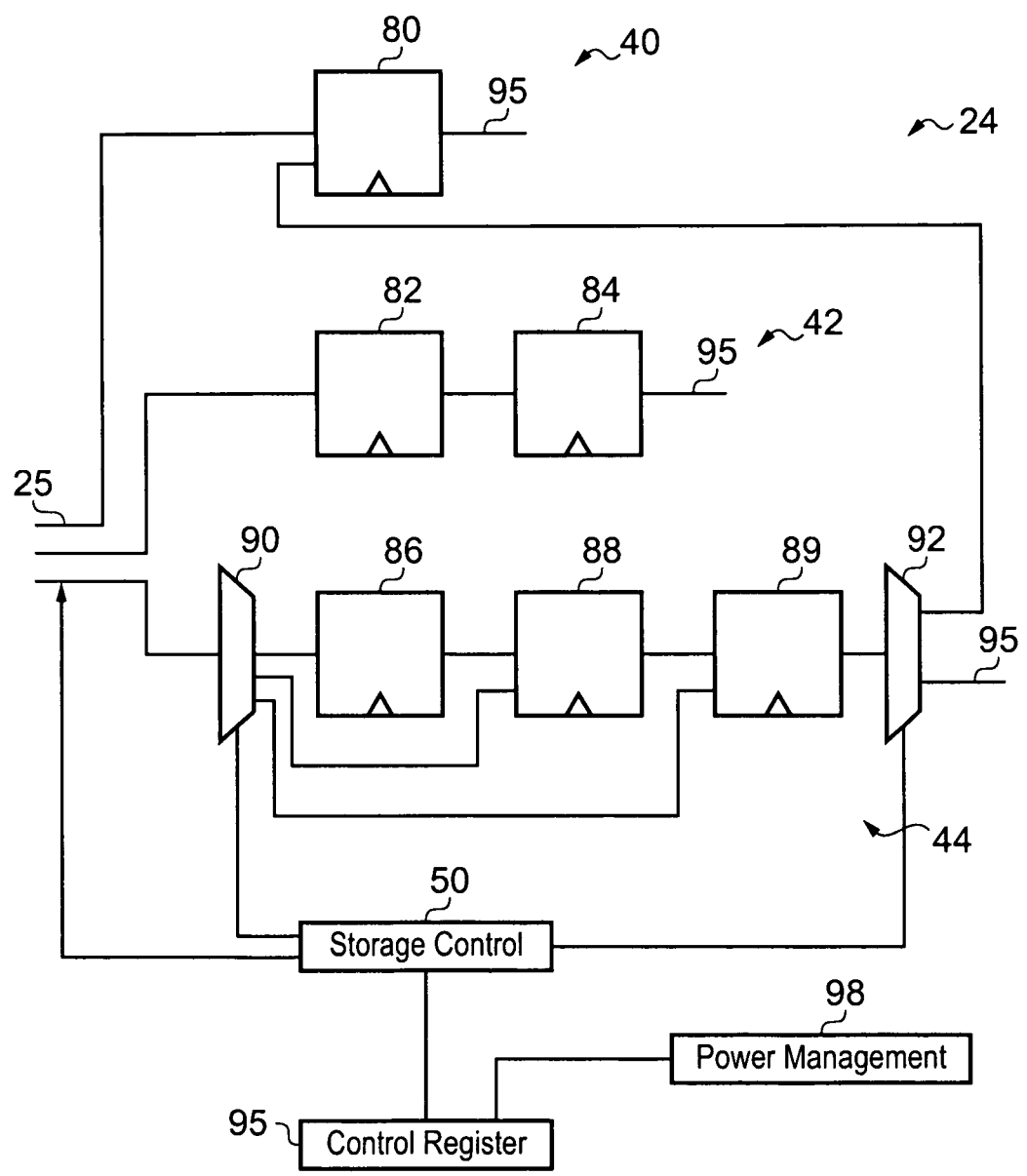
FIG. 4 shows a configurable trace output unit according to an embodiment of the present invention.

FIG. 4 shows an embodiment of trace output circuitry 24 where the data storage capacity of the different parallel data stores is configurable. Thus, in this embodiment the different data stores are made up of discrete buffers 80, 82, 84, 86, 88 and 89. There is then routing circuitry 90, 92 which controls how these buffers are connected together. In this embodiment, there is a control register 95 which stores configuration information indicating the required size of the different data stores. Storage control circuitry 50 reads the information from control register 50 and controls the routing circuitry 90, 92 accordingly. Thus, if control register 95 indicates that buffer 44 does not require much storage capacity, routing circuitry 90, 92 will connect buffer 89 to receive the input trace stream and buffers 86 and 88 will not form part of data store 44. In this case, power management circuitry 98 inhibits the clock signal transmitted to buffers 86 and 88 such that they are no longer clocked and in this way, power is saved. Control register 95 indicates that buffers 40 and 42 are required and thus, multiplexer 92 selects the output 95 rather than the data path that would connect buffer 80 to the data store 44.

In another embodiment, control register 95 might indicate that buffer 44 requires a lot of storage space while buffer 40 is not required for this particular trace stream or portion of trace stream. In this case routing circuitry 90 connects the trace stream input to buffer 86, and multiplexer 92 connects the output of buffer 89 to buffer 80. Thus, buffers 86, 88 and 89 are arranged in series to form data store 44. In this way, a trace stream that generates a lot of items on the channels connected to buffer 44 and no items on the channel connected to buffer 40 can be efficiently accommodated.

It should be noted that the buffers may have different widths where data store 40 is configured to accommodate perhaps a wider data item than data store 44. However, buffer 80 can still be connected in series with buffers 86, 88 and 89 although some of the width of buffer 80 will not be used when it is arranged in this configuration.

Figure 5:
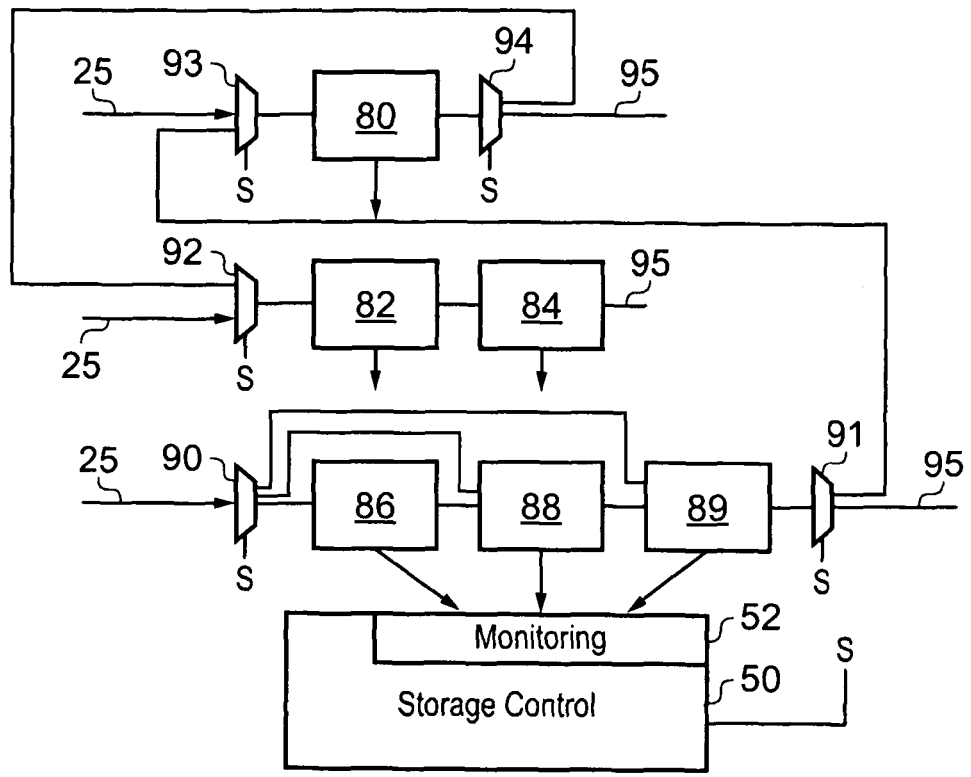
FIG. 5 shows a configurable data output unit according to an embodiment of the present invention where buffer size is controlled in dependence upon buffer occupancy.

FIG. 5 shows an alternative way of configuring the trace output circuitry 24. In this embodiment buffers 80, 82, 84, 86, 88 and 89 form the three data stores 40, 42 and 44 as in the previous embodiments. There is also routing circuitry in the form of multiplexers 90-93 which allow the buffers to be connected in various configurations.

In this embodiment, monitoring circuitry 52 associated with the storage control circuitry 50 monitors the occupancy of the different buffers and changes the configuration of the data stores in response to the information received. Thus, if it determines that data store 44 is nearly empty, it will control multiplexer 90 such that the input trace data is input directly to buffer 89 and does not pass through buffers 86 or 88. Buffers 86 and 88 may or may not be powered down depending upon whether or not power management circuitry exists. In this particular embodiment, there is the possibility for all the buffers to be linked via the multiplexers to form a serial buffer. This can be used where the input trace stream is expected to only contain trace data and no related trace items during a predetermined period and thus, the other data stores are not required.

Figure 6:
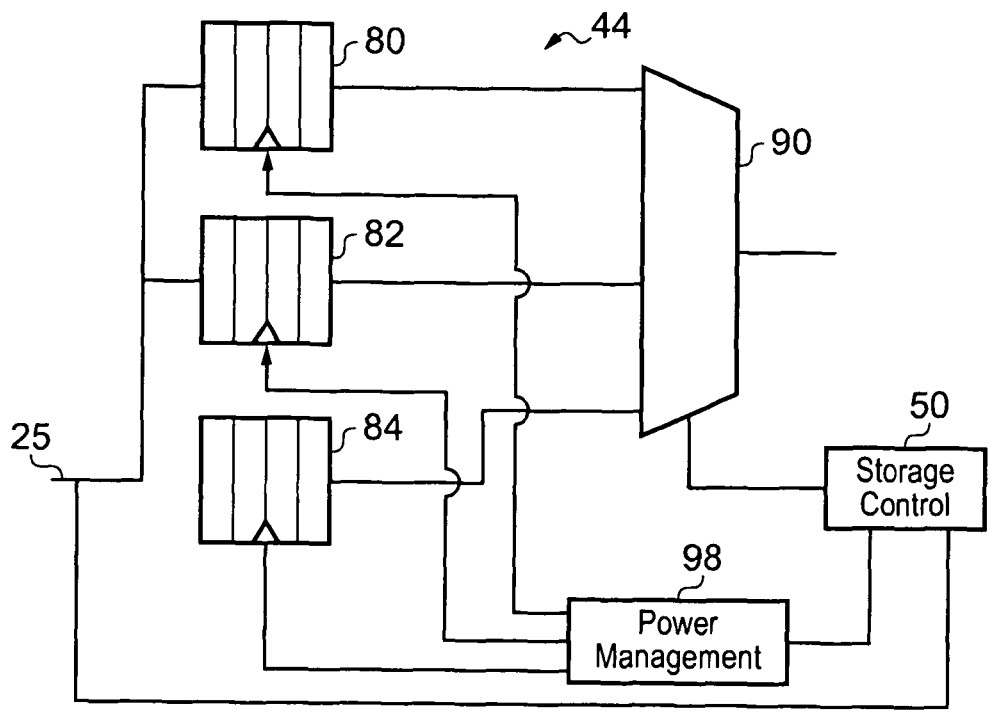
FIG. 6 shows an alternative arrangement of buffers forming the different data stores in an output unit according to an embodiment of the present invention.

FIG. 6 shows an alternative arrangement for a configurable data store 44 of the trace output unit 24. In this embodiment, the buffers 80, 82 and 84 are arranged in parallel with the multiplexer 90 controlling which buffer data is output from in dependence upon a knowledge of the order the data was stored in. If there is little data received, then only one of the buffers may be needed and power management circuitry 98 can power down the unused buffers.

Figure 7:
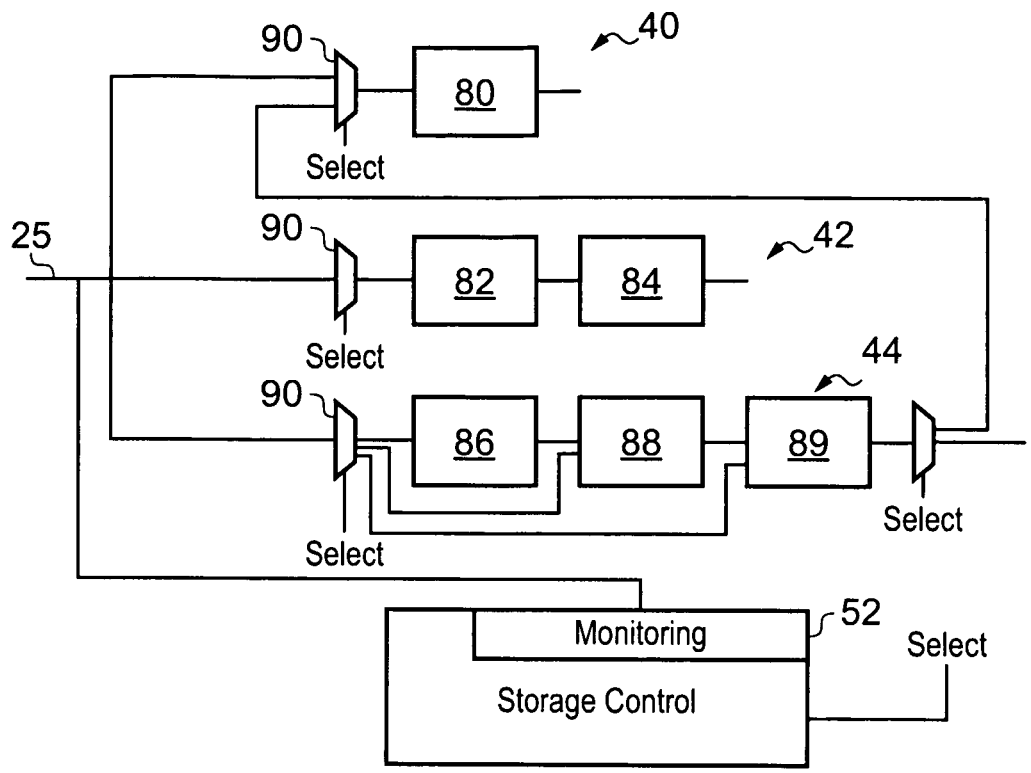
FIG. 7 shows a trace data output unit having data stores whose size is controlled in dependence upon the characteristics of the input trace data stream.

FIG. 7 shows an embodiment similar to FIG. 5 except that in this embodiment storage control circuitry 50 does not monitor the occupancy of the buffers forming the different data stores, it monitors rather the input trace data stream and determines from this, the storage requirements of the various data stores and controls the routing circuitry 90 accordingly.

Thus, if it notes that the characteristics of the input trace stream have changed such that there is no data being received on the data paths routed to data store 40, the multiplexers 90 forming the routing circuitry can be controlled to connect buffers 86, 88, 89 and 80 in series to form data store 44 and data store 40 will not exist.

Figure 8:
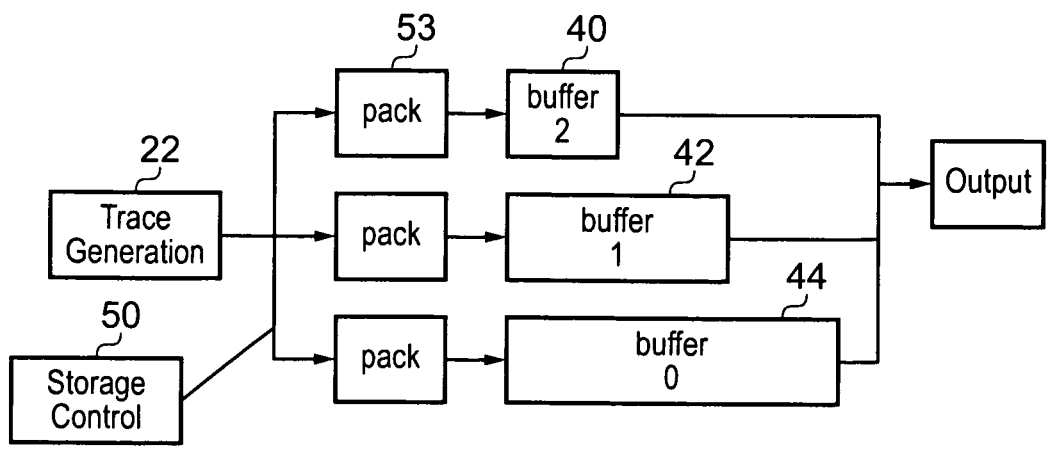
FIG. 8 shows a trace output unit having packing circuitry for each individual buffer.

FIG. 8 shows trace generation circuitry 22 that monitors the processing activity of processors not shown being traced and generates trace data in response to this activity. In this embodiment, storage control circuitry 50 routes the received trace data to the parallel buffers 40, 42 and 44 and prior to storing the data in these buffers the data is packed such that it is always stored in the least significant bits of the buffers. This is done by packing circuitry 53. Each of the buffers has its own packing circuitry and packs the data received for that buffer accordingly. Thus, it is different to the packing circuitry 52 of FIG. 3 that packs the received trace stream prior to sending the packed data to the individual buffers. Packing the data in this way requires a less expensive packing function than is required for the packing function associated with the whole width of the trace data stream as in FIG. 3. However, it doesn't have the advantage associated with the system of FIG. 3 of making the size required for the buffers more predictable.

Figure 9:
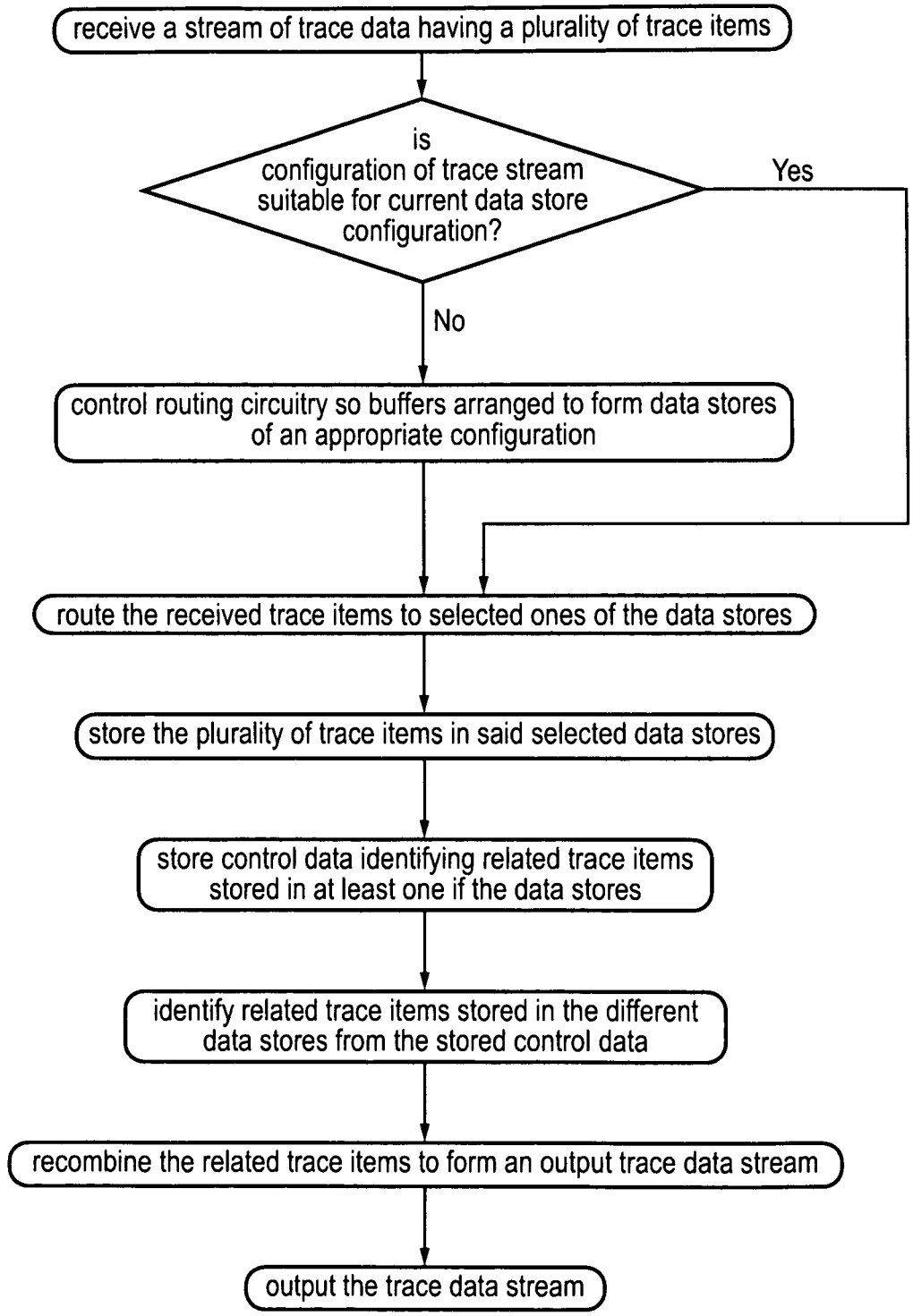
FIG. 9 shows a flow diagram illustrating steps in a method of storing trace data according to an embodiment of the present invention.

FIG. 9 shows a flow diagram illustrating steps in a method according to an embodiment of the present invention. Initially a stream of trace data having trace items is received and the storage control circuitry determines if the configuration of the trace stream is suitable for the current data store configuration. If it is then the received trace items are routed to an appropriate data store. If it is not then the control routing circuitry is changed so that data stores of an appropriate configuration are formed by the individual buffers that make up the data stores. Once they have been amended in this way the received trace items are routed to an appropriate one of the data stores. The trace items are then stored in the selected data store to which they have been routed, and control data identifying related trace items is stored alongside the trace items in the data stores where appropriate. The output control circuitry identifies related trace items that are stored in the different data stores from the stored control data and the related trace items are output in an appropriate order to form an output trace data stream.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims. For example, various combinations of the features of the following dependent claims could be made with the features of the independent claims without departing from the scope of the present invention.

We claim:

1. A trace output unit for collecting, buffering and outputting trace data generated by trace circuitry monitoring processing activities of a data processing apparatus, said trace output unit comprising:
   an input for receiving a stream of said trace data;
   a plurality of data stores arranged in parallel with each other for storing said trace data;
   storage control circuitry for controlling storage of trace items of said trace data in said data stores, said storage control circuitry being configured to route said trace items to selected ones of said data stores and to store control data identifying related ones of said trace items stored in different ones of said plurality of data stores; and
   output control circuitry configured to identify said related ones of said trace items stored in said different ones of said plurality of data stores from said stored control data, to determine an output order for said related ones of said trace items from said control data and to recombine said related ones of said trace items from different data stores to form an output trace data stream having said output order.

2. A trace output unit according to claim 1, wherein at least some of said plurality of data stores are of different data widths and depths, and said received stream of trace data comprises a plurality of different types of trace items, said storage control circuitry being configured to route a trace item of a same type to a same at least one data store.

3. A trace output unit according to claim 1, wherein said storage control circuitry is configured to store said control data identifying said related ones of said trace items in one of said plurality of data stores in association with at least one of said related ones of said trace items.

4. A trace output unit according to claim 1, wherein said plurality of data stores comprises a plurality of trace data stores for storing said trace items and a control data store for storing said control data.

5. A trace output unit according to claim 4, wherein said control data store is further configured to store a synchronisation indicator, said output control circuitry being responsive to detection of said synchronisation indicator in said control data store to generate a synchronisation packet and to output said synchronisation packet in said output trace data stream.

6. A trace output unit according to claim 1, wherein said storage control circuitry is responsive to receipt of a synchronisation indicator to store control data indicative of said synchronisation indicator in one of said plurality of data stores, said output control circuitry being responsive to detection of said synchronisation indicator in said one of said data stores, to generate a synchronisation packet and to output said synchronisation packet in said output trace data stream.

7. A trace output unit according to claim 1, wherein said trace items comprise items of trace data indicative of monitored processing activity, items indicating a source of said trace data and items providing timestamp information, said control data identifying related items.

8. A trace output unit according to claim 1, wherein said input comprises a plurality of parallel data paths, at least some of said data paths transmitting trace data more frequently than other of said data paths, said storage control circuitry being configured to route said trace data to one of said plurality of data stores in dependence upon a data path said trace data is received on.

9. A trace output unit according to claim 1, wherein said input comprises a plurality of parallel data paths, at least some of said data paths transmitting trace data more frequently than other of said data paths, said trace output unit further comprising packing circuitry configured to pack received trace data such that said received trace data is arranged in adjacent locations prior to being routed to at least one of said plurality of parallel data stores.

10. A trace unit comprising:
the trace output unit according to claim 1, for receiving said trace data generated by said trace circuitry and for outputting said output trace data stream: and
said trace circuitry for monitoring at least one processor and for generating said trace data indicative of a behaviour of said at least one processor.

11. A data processing apparatus, comprising:
the trace unit according to claim 10, for monitoring said at least one processor and for generating said trace data indicative of said behaviour of said at least one processor; and
said at least one processor for processing data.

12. A trace output unit for collecting, buffering and outputting trace data generated by trace circuitry monitoring processing activities of a data processing apparatus, said trace output unit comprising:
an input for receiving a stream of said trace data;
a plurality of data stores arranged in parallel with each other for storing said trace data;
storage control circuitry for controlling storage of trace items of said trace data in said data stores, said storage control circuitry being configured to route said trace items to selected ones of said data stores and to store control data identifying related ones of said trace items stored in different ones of said plurality of data stores; and
output control circuitry configured to identify said related ones of said trace items stored in said different ones of said plurality of data stores from said stored control data and to recombine said related ones of said trace items from different data stores to form an output trace data stream,
wherein said plurality of data stores comprises a plurality of trace data stores for storing said trace items and a control data store for storing said control data,
wherein said control data store is further configured to store a synchronisation indicator, said output control circuitry being responsive to detection of said synchronisation indicator in said control data store to generate a synchronisation packet and to output said synchronisation packet in said output trace data stream, wherein said storage control circuitry is configured to suppress storage of said trace data for a clock cycle in which said synchronisation indicator is stored in said control data store.

13. A trace output unit for collecting, buffering and outputting trace data generated by trace circuitry monitoring processing activities of a data processing apparatus, said trace output unit comprising:
an input for receiving a stream of said trace data;
a plurality of data stores arranged in parallel with each other for storing said trace data;
storage control circuitry for controlling storage of trace items of said trace data in said data stores, said storage control circuitry being configured to route said trace items to selected ones of said data stores and to store control data identifying related ones of said trace items stored in different ones of said plurality of data stores; and
output control circuitry configured to identify said related ones of said trace items stored in said different ones of said plurality of data stores from said stored control data and to recombine said related ones of said trace items from different data stores to form an output trace data stream,
wherein said plurality of data stores are formed of a plurality of buffers connected together via routing circuitry, said routing circuitry being controllable to connect at least some of said buffers in series with each other to form one of said plurality of data stores with a data depth equal to a sum of a data depth of said buffers connected in series, and to connect at least some of said buffers in parallel.

14. A trace output unit according to claim 13, wherein said storage control circuitry is configured to control said routing circuitry to connect different buffers in series with each other to increase or decrease a data depth of one of said plurality of data stores in dependence upon a configuration of said stream of said trace data.

15. A trace output unit according to claim 13, further comprising a programmable configuration register for storing configuration data, said storage control circuitry being configured to control said routing circuitry in dependence upon said stored configuration data.

16. A trace output unit according to claim 13, wherein said storage control circuitry is configured to determine current storage requirements of said plurality of parallel data stores in dependence upon said stream of said trace data and to control said routing circuitry to connect said buffers to form said parallel data stores with said current storage requirements.

17. A trace output unit according to claim 16, wherein said storage control circuitry comprises monitoring circuitry for monitoring occupancy of said plurality of data stores, said storage control circuitry determining said current storage requirements from said monitored occupancy.

18. A trace output unit according to claim 16, said storage control circuitry being configured to monitor said stream of said trace data and to determine said current storage requirements from a configuration of said stream of said trace data.

19. A trace output unit according to claim 13, said trace output unit further comprising power management circuitry for controlling clocking of said buffers, said storage control circuitry being configured to determine current storage requirements of said plurality of data stores and to control said routing circuitry to connect said buffers to form said plurality of data stores with said current storage requirements and to disconnect any buffers not required from said plurality of data stores and to not clock said disconnected buffers.

20. A trace output unit according to claim 19, wherein said storage control circuitry is configured to determine said current storage requirements periodically during tracing of said processing apparatus.

21. A trace output unit for collecting, buffering and outputting trace data generated by trace circuitry monitoring processing activities of a data processing apparatus, said trace output unit comprising:
an input for receiving a stream of said trace data;
a plurality of data stores for storing said trace data, said plurality of data stores being formed of a plurality of buffers connected together via routing circuitry, said routing circuitry being controllable to connect at least some of said buffers in series with each other to form one of said data stores with a data depth equal to a sum of a data depth of said buffers connected in series, and being controllable to connect at least some of said buffers in parallel with each other;

storage control circuitry for controlling storage of trace items of said trace data in said data stores, said control circuitry being configured to route said trace items to selected ones of said data stores and to store control data identifying related ones of said trace items stored in different data stores; and output control circuitry configured to identify said related ones of said trace items stored in different data stores from said stored control data and to recombine said related ones of said trace items from different data stores to form an output trace data stream.

22. A trace output unit according to claim 21, wherein said trace items comprise items of trace data indicative of monitored processing activity, items indicating a source of said trace data and items providing timestamp information, said control data identifying related items.

23. A trace output unit according to claim 21, said trace output unit further comprising power management circuitry for controlling clocking of said buffers, said storage control circuitry being configured to determine current storage requirements of said plurality of data stores and to control said routing circuitry to connect said buffers to form said plurality of data stores with said required storage capacity and to disconnect any buffers not required from said plurality of data stores and to not clock said disconnected buffers.

24. A method of collecting, buffering and outputting trace data generated by trace circuitry monitoring processing activities of a data processing apparatus, comprising the steps of:

receiving a stream of said trace data comprising a plurality of trace items at a trace data input;

routing said plurality of trace items to selected ones of a plurality of data stores arranged in parallel with each other; and storing said plurality of trace items in said selected data stores;

storing control data identifying related ones of said trace items stored in different ones of said plurality of data stores;

identifying said related ones of said trace items that are stored in said different ones of said plurality of data stores and that are related to each other from said stored control data;

determining an output order for said related ones of said trace items from said control data;

recombining said related ones of said trace items to form an output trace data stream having said output order; and outputting said output trace data stream.

25. A method according to claim 24, wherein said trace items comprise items of trace data indicative of monitored processing activity, items indicating a source of said trace data and items providing timestamp information, said control data identifying related items.

26. A method of collecting, buffering and outputting trace data generated by trace circuitry monitoring processing activities of a data processing apparatus, comprising the steps of:

receiving a stream of said trace data comprising a plurality of trace items at a trace data input;

routing said plurality of trace items to selected ones of a plurality of data stores arranged in parallel with each other; and storing said plurality of trace items in said selected data stores;

storing control data identifying related trace items stored in different ones of said plurality of data stores;

identifying said related trace items that are stored in said different ones of said plurality of data stores and that are related to each other from said stored control data;

recombining said related trace items to form an output trace data stream;

outputting said output trace data stream, wherein said selected data stores each comprise a plurality of buffers; determining current storage requirements of said selected data stores; and connecting said buffers to form said selected data stores with said current storage requirements and disconnecting any buffers not required from said data stores and not clocking said disconnected buffers.

* * * * *